United States Patent
Pizzoni et al.

(10) Patent No.: US 6,708,577 B2
(45) Date of Patent: Mar. 23, 2004

(54) BALL SCREW SHAFT WITH INCREASED VIBRATION FREQUENCY AND IMPROVED VIBRATION DISSIPATION

(75) Inventors: Luciano Pizzoni, Foligus (IT); Federico Perni, Trevi (IT)

(73) Assignee: Umbra Cuscinetti S.p.A., Foligno (IT)

( * ) Notice: Subject to any disclaimer, the term of this patent is extended or adjusted under 35 U.S.C. 154(b) by 0 days.

(21) Appl. No.: 10/025,490

(22) Filed: Dec. 26, 2001

(65) Prior Publication Data
US 2002/0078773 A1 Jun. 27, 2002

(30) Foreign Application Priority Data
Dec. 22, 2000 (IT) ...................... RM2000A0692

(51) Int. Cl.[7] ............................................. F16H 25/24
(52) U.S. Cl. ................................... 74/89.36; 74/424.81
(58) Field of Search ............................. 74/89.36, 424.81

(56) References Cited

U.S. PATENT DOCUMENTS

| | | | | | |
|---|---|---|---|---|---|
| 3,754,746 | A | * | 8/1973 | Thiele | 267/151 |
| 4,237,176 | A | * | 12/1980 | Brueggemann et al. | 428/212 |
| 4,623,586 | A | * | 11/1986 | Umeya et al. | 428/324 |
| 4,906,518 | A | * | 3/1990 | Inabata | 428/218 |
| 5,016,602 | A | * | 5/1991 | Mizek | 124/89 |
| 5,020,644 | A | * | 6/1991 | Novoa | 188/378 |
| 5,197,707 | A | * | 3/1993 | Kohan | 248/638 |
| 5,217,308 | A | * | 6/1993 | Schroeder | 384/45 |
| 5,318,837 | A | * | 6/1994 | Yoshinaka et al. | 428/328 |
| 5,379,660 | A | * | 1/1995 | Ishikawa | 74/89.36 |
| 5,400,296 | A | * | 3/1995 | Cushman et al. | 367/1 |
| 5,451,454 | A | * | 9/1995 | Fukahori et al. | 428/318.4 |
| 5,613,400 | A | * | 3/1997 | Sato et al. | 74/89.36 |
| 5,658,656 | A | * | 8/1997 | Whitney et al. | 428/304.4 |
| 5,716,997 | A | * | 2/1998 | Toyosawa et al. | 521/52 |
| 5,820,348 | A | * | 10/1998 | Fricke | 416/248 |
| 5,924,261 | A | * | 7/1999 | Fricke | 52/720.1 |
| 5,960,236 | A | * | 9/1999 | Zaman et al. | 399/91 |
| 6,106,952 | A | * | 8/2000 | Yamashita et al. | 428/425.8 |

* cited by examiner

Primary Examiner—David A. Bucci
Assistant Examiner—Julie K. Smith
(74) Attorney, Agent, or Firm—Browdy and Neimark, P.L.L.C.

(57) ABSTRACT

A ball screw shaft, with increased vibration frequency and improved vibration dissipation, having a longitudinal cylindrical internal cavity, closed at its ends by means of inserted terminals or plugs, has in said cavity a filling of granular material with low density and high superficial roughness freely distributed and, moreover, according to a variation of the invention, said longitudinal cylindrical internal cavity has inserted therein a pipe made of composite polymeric material, whose outer surface is made adherent and integral with the inner wall of the longitudinal cylindrical cavity; said pipe having in its longitudinal cavity said filling made of granular material with low density and high superficial roughness.

10 Claims, 1 Drawing Sheet

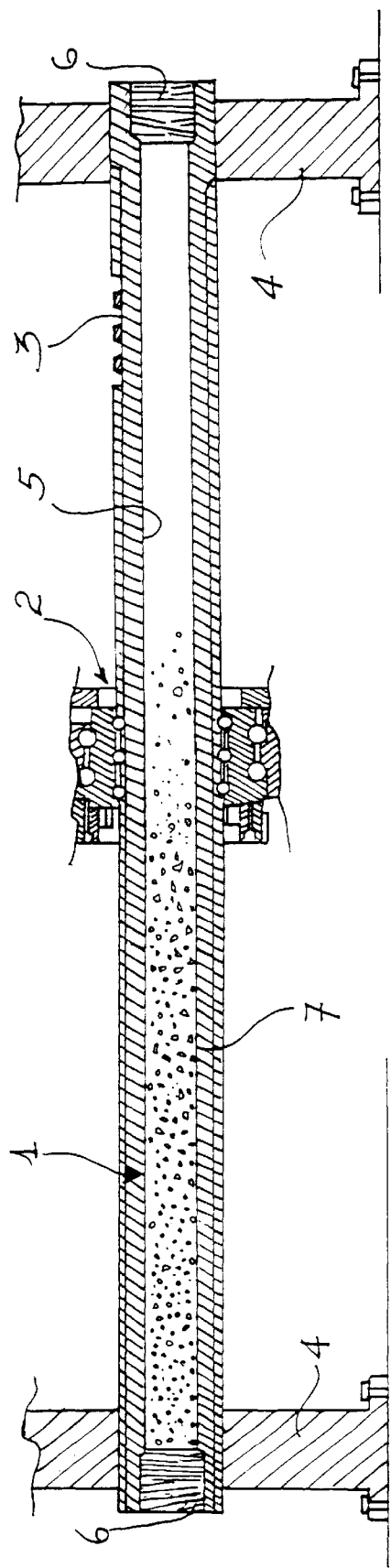
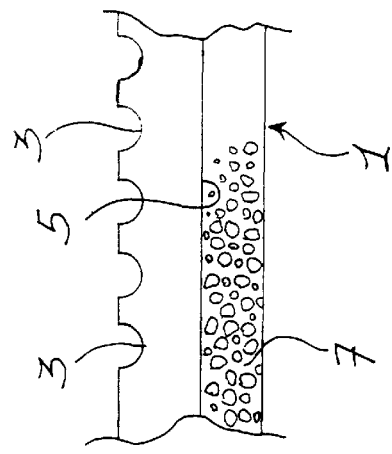
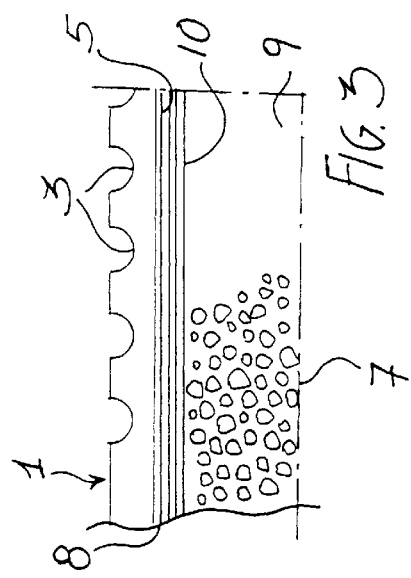
FIG. 1
FIG. 2
FIG. 3

BALL SCREW SHAFT WITH INCREASED VIBRATION FREQUENCY AND IMPROVED VIBRATION DISSIPATION

BACKGROUND OF THE INVENTION

The present invention relates to a ball screw shaft, provided with means for dissipating vibrations, of the kind having a longitudinal cylindrical internal cavity, closed at its ends by means of inserted terminals or plugs.

PRIOR ART

In ball screw devices of the kind with rotating nut screw, as well as those in which the shaft rotates, the natural vibration frequency of the shaft remains low. Therefore, when the frequency of small vibrations, applied to the shaft by the nut screw through its vibration, are in area of the critical velocity of the shaft, such resonance phenomena occur as to cause large vibrations in the screw shaft because of the great distance between the supports of the shaft.

Within the field of known solutions to the problem, it is found that the unexamined Japanese patent publication N. 6-11009 provides a screw shaft bearing, in one its longitudinal cavity, a long stem serving as vibration controlling mass member, which comes in contact with the inner surface of said cavity when the shaft screw vibrates. Said collision limits the vibration of the screw shaft in its resonance point, which shaft is therefore able to operate at velocities exceeding its critical velocity. However, when the screw shaft is excited at low frequency, the screw shaft and the vibration controlling mass member do not always move relative to each other so as to touch each other, and in the aforementioned patent no concrete means are indicated to allow the screw shaft and the vibration controlling mass element to move in such a way as to expect such a behaviour.

Subsequently, U.S. Pat. No. 5,613,400 has tackled the same problem of damping the transmission of vibrations from a nut screw to a screw shaft to prevent it from resonating and allow an operation with a long travel and high speed. This patent discloses a ball screw device having a screw shaft including a longitudinal internal cavity with a longitudinal vibration controlling mass member within it, held by support bushings, and a damping element interposed between the vibration controlling mass member and the inner surface of the longitudinal cavity of the screw shaft to prevent contact between the vibration controlling mass member and the longitudinal cavity. According to the aforementioned patent, the vibration controlling mass member is constituted by a single rigid steel hold ring fastened to the ends of the screw shaft.

Although said steel hold ring, as a vibration controlling means, is provided associated to various damping and supporting means in different embodiments, nonetheless it cannot provide a satisfactory damping effect in a low frequency area and limit vibrations in a wide range of frequencies in correspondence with the natural frequency of the screw shaft that varies with the position of the nut screw.

SUMMARY OF THE INVENTION

The present invention is therefore aimed at solving the problem stated above, overcoming the limits and drawbacks of the prior art.

Thus, the main aim of the invention is to provide dissipater means able to transform the vibration energy into other forms of energy, especially into thermal energy.

Another aim of the invention is to increase the strength of the screw shaft at equal weights thereof.

An additional aim of the invention is to reduce the weight of the shaft relative to other known hollow shafts of equal size, consequently to obtain a reduction of deflection, so that the shaft can have a higher frequency than said other shafts.

The aims are achieved by the present invention which provides a ball screw shaft with increased vibration frequency and improved vibration dissipation, of the kind having a longitudinal cylindrical internal cavity, closed by means of inserted terminals or plugs at the ends of the screw shaft and housing vibration controlling means, which, from a general point of view, is characterized in that said screw shaft has in said longitudinal cylindrical internal cavity a filling of granular material with low density and high superficial roughness freely distributed and, moreover, according to a variation of the invention, said longitudinal cylindrical has inserted therein a pipe made of composite polymeric material, whose outer surface is made adherent and integral with the inner wall of the cylindrical longitudinal cavity; said pipe made of composite material having in its longitudinal cavity a filling of granular material with low density and high superficial roughness freely distributed.

BRIEF DESCRIPTION OF THE DRAWINGS

Further characteristics and advantages of the present invention shall become more readily apparent from the detailed description that follows of a preferred embodiment, illustrated purely by way of non limiting indication, in the accompanying drawings in which:

FIG. 1 shows a longitudinal section of a screw shaft according to the present invention;

FIG. 2 shows an enlarged scale longitudinal section of an end portion of the screw shaft of FIG. 1;

FIG. 3 shows an enlarged scale longitudinal section of an end portion of a variation of screw shaft.

DESCRIPTION OF THE PREFERRED EMBODIMENTS

With reference to FIGS. 1 and 2, a metallic ball screw shaft is globally indicated with the reference number 1, and a nut screw advancing thereon is indicated with 2. The screw groove of the shaft is indicated only partially with the reference 3, although it should be understood that it is provided over the whole length of the screw shaft 1. The nut screw 2 is also shown only partially and it is not described, as it is a wholly conventional device. Purely by way of example, the screw shaft is replaced by end stands generally indicated with the number 4, but obviously they can be replaced with other support means depending on the application. The shaft 1 has a longitudinal cylindrical internal cavity 5, which is closed at its ends by means of threaded plugs or inserted terminals generically indicated with the number 6. The screw shaft 1 has in the longitudinal cylindrical internal cavity 5 a filling of granular material with low density and high superficial roughness freely distributed, i.e. not necessarily compacted or pressed. Said granular material, which moreover has ample exterior surfaces, must exhibit stability over time, and may be constituted, for instance, by expanded clay or polystyrene foam. Said two materials have experimentally yielded good results, but obviously they can be replaced with other synthetic materials having the same characteristics indicated above.

Said granular material 7 allows, thanks to its inherent characteristics, a fast dissipation of vibration energy into friction, and hence into heat. The system therefore exhibits high internal damping by effect of the granular material.

In a variation of the screw shaft according to the invention, shown in the detail of FIG. 3, it has in the longitudinal cylindrical cavity 5 a pipe 8 made of composite polymeric material. The outer surface of the pipe 8 is made adherent and integral with the inner wall of the longitudinal cylindrical cavity 5 and, in turn, it has a longitudinal cavity 9 whose inner surface 10 delimits said filling of granular material 7.

In this variation, advantageously, the plugs or inserted terminals 6 are glued to end portions of said pipe made of composite polymeric material. Said plugs can be integrated with the terminals of the screw shaft.

The composite polymeric material of the pipe 8 is made of long fibres, preferably carbon, buried in a plastic material-resin matrix, advantageously constituted, for instance, by epoxy resin.

From the structural combination of metal on the grooves 3 and of high module polymeric composite of the inner pipe 8 derives a shaft with high flexural rigidity, equal to or greater than that of a solid shaft. Use of the inner pipe 8 makes it possible to minimize the thickness of the metallic material of the shaft 1 and hence reduces the weight of the shaft 1 with respect to a hollow shaft of the same size. Moreover, with respect thereto, the deflection of the shaft 1 is decrease, whilst, consequently, the vibration frequency increases.

The pipe made of composite polymeric material 8 is fastened to the inner wall of the longitudinal cavity 5 of the screw shaft by forced snap-on coupling.

Alternatively, the pipe 8 made of composite polymeric material is fastened to the inner wall of the longitudinal cavity 5 of the shaft screw by interposition of an adhesive substance.

To demonstrate the improvements obtained with respect to the prior art, comparison tests were conducted on known screw shafts and a screw shaft according to the present invention.

For the tests, a test bench was selected in which the screw shaft is locked in place at the end with respective hydraulic vices. During each test the screw shaft was subjected to impact stress using an instrumented hammer PCB 086B04 with rubber tip. The response of the screw shaft was measured with a piezoelectric accelerometer whose natural frequency is equal to 51 kHz. The piezoelectric accelerometer was positioned at the centre of the screw, where acceleration is greatest. Both the signal of the instrumented hammer (force signal) and that of the accelerometer (acceleration and displacement signal) were sampled. To improve signal-to-noise ratio, multiple-sample averages were obtained for each measurement point.

Analysing the results of the tests performed on the screw shaft according to the present invention, compared to the results on the prior art screw shaft, a considerable increase was noted in the internal damping of the system: displacement amplitude rapidly drops to nil about 0.9 seconds after the hammer blow.

Naturally, the invention thus conceived can be subject to numerous modifications and variations, without thereby departing from the scope of the inventive concept.

What is claimed is:

1. A metallic ball screw shaft that dissipates vibration having a longitudinal cylindrical internal cavity, a pipe made of composite polymeric material engaged in said longitudinal cylindrical internal cavity, an outer surface of the pipe fixed to the inner wall of the longitudinal cylindrical cavity of the shaft; the pipe having a longitudinal cavity filled with a granular material with low density and high superficial roughness which is freely distributed within the pipe;

wherein plugs or inserted terminals are integrally inserted in end portions of said pipe made of composite polymeric material.

2. Screw shaft as claimed in claim 1, wherein said granular material with low density and high superficial roughness is constituted by expanded clay.

3. Screw shaft as claimed in claim 1, wherein said granular material with low density and high superficial roughness is constituted by polystyrene foam.

4. Screw shaft as claimed in claim 1, wherein said composite polymeric material of the pipe is formed by long fibres buried in a matrix of polymeric plastic material.

5. Screw shaft as claimed in claim 4, wherein said long fibres of the composite material are carbon fibres.

6. Screw shaft as claimed in claim 4, wherein said plastic material of the matrix of the composite polymeric material is constituted by epoxy resin.

7. Screw shaft as claimed in claim 1, wherein said pipe made of composite polymeric material is fastened to the inner wall of the longitudinal cavity of the screw shaft by forced snap-on coupling.

8. Screw shaft as claimed in claim 1, wherein the pipe made of composite polymeric material is fastened to the inner wall of the longitudinal cavity of the screw shaft by interposition of an adhesive substance.

9. Screw shaft as claimed in claim 1, wherein said granular material with low density and high superficial roughness is constituted by expanded clay.

10. Screw shaft as claimed in claim 1, wherein said granular material with low density and high superficial roughness is constituted by polystyrene foam.

* * * * *